United States Patent
Soga

(10) Patent No.: US 10,486,507 B2
(45) Date of Patent: Nov. 26, 2019

(54) SUN VISOR FOR VEHICLE

(71) Applicant: KYOWA SANGYO CO., LTD., Toyota-shi, Aichi (JP)

(72) Inventor: Junichi Soga, Toyota (JP)

(73) Assignee: KYOWA SANGYO CO., LTD., Toyota (JP)

( * ) Notice: Subject to any disclaimer, the term of this patent is extended or adjusted under 35 U.S.C. 154(b) by 42 days.

(21) Appl. No.: 15/892,934

(22) Filed: Feb. 9, 2018

(65) Prior Publication Data
US 2018/0236850 A1 Aug. 23, 2018

(30) Foreign Application Priority Data

Feb. 20, 2017 (JP) .................... 2017-028837

(51) Int. Cl.
*B60J 3/00* (2006.01)
*B60J 3/02* (2006.01)

(52) U.S. Cl.
CPC .......... *B60J 3/0278* (2013.01); *B60J 3/0252* (2013.01)

(58) Field of Classification Search
CPC .............................. B60J 3/0278; B60J 3/0252
See application file for complete search history.

(56) References Cited

U.S. PATENT DOCUMENTS

| | | | | |
|---|---|---|---|---|
| 3,428,360 A | * | 2/1969 | Honor, Sr. ............ | B60J 3/0208 296/97.6 |
| 4,668,005 A | * | 5/1987 | Dietz .................... | B60J 3/023 24/625 |
| 5,131,711 A | * | 7/1992 | Laferle .................. | B60J 3/0278 24/662 |
| 5,205,639 A | * | 4/1993 | White .................... | B60J 3/0278 296/97.2 |
| 5,308,137 A | * | 5/1994 | Viertel ................ | B29C 44/0446 264/296 |
| 5,338,082 A | | 8/1994 | Miller | |
| 5,580,118 A | * | 12/1996 | Crotty, III ............. | B60J 3/0208 296/97.1 |
| 5,716,092 A | | 2/1998 | Dellinger et al. | |
| 5,887,933 A | * | 3/1999 | Peterson ................ | B60J 3/0278 296/97.1 |
| 6,634,696 B1 | * | 10/2003 | Tiesler .................. | B60J 3/0204 296/97.1 |
| 6,659,528 B1 | * | 12/2003 | Wilson .................. | B60J 3/0239 296/97.11 |
| 6,926,336 B1 | * | 8/2005 | Crotty, III ............. | B60J 3/0278 296/97.1 |

(Continued)

FOREIGN PATENT DOCUMENTS

JP 2005-212478 A 8/2005

*Primary Examiner* — Lori L Lyjak
(74) *Attorney, Agent, or Firm* — Oliff PLC

(57) ABSTRACT

A sun visor for a vehicle, includes a sun visor body including a pair of shell-shaped halved bodies that are joined to each other at multiple positions, and an arm. At least one joining structure of multiple joining structures including a pin portion projecting from an inner surface of the halved body of one half and an insertion hole of the halved body of the other half through which the pin portion can be inserted. A front end of the pin portion has an umbrella-like portion formed by riveting so as to restrict a relative movement between the halved body of the one half and the halved body of the other half in the thickness direction.

7 Claims, 10 Drawing Sheets

(56) References Cited

U.S. PATENT DOCUMENTS

| | | | |
|---|---|---|---|
| 7,025,399 B1* | 4/2006 | Crotty, III | B60J 3/0278 296/97.1 |
| 7,152,901 B2 | 12/2006 | Kleyn | |
| 7,338,108 B2 | 3/2008 | Iwatsuka et al. | |
| 8,556,325 B2 | 10/2013 | Huff et al. | |
| 2001/0024048 A1* | 9/2001 | Hobson | B60J 3/0278 296/97.1 |
| 2004/0066056 A1* | 4/2004 | Mills | B60J 3/0278 296/97.1 |
| 2004/0145209 A1* | 7/2004 | Peterson | B60J 3/0208 296/97.11 |
| 2005/0167886 A1* | 8/2005 | Hiemstra | B29C 45/0003 264/297.1 |
| 2005/0168508 A1 | 8/2005 | Hilton et al. | |
| 2006/0087147 A1 | 4/2006 | Kleyn | |
| 2006/0175869 A1* | 8/2006 | Torii | B60J 3/0239 296/187.05 |
| 2011/0169295 A1* | 7/2011 | Huelke | B60R 13/0206 296/97.11 |
| 2012/0097194 A1* | 4/2012 | McDaniel | A01N 63/02 134/26 |
| 2013/0069388 A1* | 3/2013 | Huff | B60J 3/023 296/97.5 |
| 2016/0167490 A1* | 6/2016 | Janowiak | B60J 3/0282 362/511 |
| 2016/0167573 A1* | 6/2016 | Janowiak | B60J 3/0282 362/511 |

\* cited by examiner

SUN VISOR FOR VEHICLE

INCORPORATION BY REFERENCE

The disclosure of Japanese Patent Application No. 2017-028837 filed on Feb. 20, 2017 including the specification, drawings and abstract is incorporated herein by reference in its entirety.

BACKGROUND

1. Technical Field

The present disclosure relates to a sun visor for a vehicle, and specifically, to a sun visor for a vehicle including a sun visor body formed by joining a pair of shell-shaped halved bodies to each other at multiple positions, and an arm used for fixing the sun visor body to the vehicle so as to be turnable between an in-use position and a storage position.

2. Description of Related Art

Vehicles such as automobiles are provided with sun visors as sun shade members for protecting eyes of occupants in driver-seats or passenger-seats from direct rays of the sun so as to secure the occupants' field of views. Such a sun visor is configured by a sun visor body in a substantially rectangular shape, and an arm used for fixing the sun visor body to a vehicle (a vehicle body of an automobile) in such a manner as to be turnable between an in-use position and a storage position. As shown in US 2006/0087147 A, for example, a sun visor body 110 is composed by joining a pair of shell-shaped halved bodies 120, 130 that are made of a synthetic resin having rigidity, at multiple positions (see FIG. 11). This joining is carried out by inserting each pin portion 142 formed on the halved body 130 of the other half into an insertion hole 146 of each corresponding boss 148 formed in the halved body 120 of the one half, and vibration-welding the inserted front end of the pin portion 142 to the insertion hole 146 of the boss 148 (see FIG. 12 to FIG. 13). Through this, it is possible to carry out the joining of the pair of the shell-shaped halved bodies 120, 130 to each other at the multiple positions in a simple manner. Hence, it is possible to assemble the sun visor body 110 in a simple manner. In addition, there is also provided an arm (not illustrated); therefore, for example, the sun visor body 110 can be turned between the in-use position and the storage position by picking up a lower edge of the sun visor body 110 with fingers. Therefore, the sun visor body 110 out of use can be stored in a simple manner.

SUMMARY

Unfortunately, in the above technique disclosed in US 2006/0087147 A, it is configured that the vibration welding is carried out between the insertion hole 146 of the boss 148 and the front end of the pin portion 142 inserted into the insertion hole 146 of the boss 148. With such a configuration, the part subjected to this vibration welding (the front end of the pin portion 142 in the insertion hole 146) cannot be visually checked, and thus the sun visor 101 might be shipped as a product whose finishing of the vibration welding is still in an insufficient state (in a state in which the insertion hole 146 of the boss 148 and the pin portion 142 are not firmly welded to each other). If the sun visor body 110 of the sun visor 101 shipped in such an insufficient state is fixed to a vehicle, and when the sun visor body 110 is turned between the in-use position and the storage position by picking up the lower edge of the sun visor body 110 with fingers, both the halved bodies 120, 130 might relatively move to each other in the thickness direction. Due to this relative movement, strange noises might be caused from the sun visor body 110.

The present disclosure provides a sun visor for a vehicle capable of preventing strange noises caused by a relative movement in the thickness direction between a pair of halved bodies when a sun visor body is turned between an in-use position and a storage position via an arm even if the sun visor body, which is formed by joining the pair of the halved bodies to each other, is assembled in a simple manner.

A sun visor for a vehicle according to an aspect of the present disclosure, includes: a sun visor body including a pair of shell-shaped halved bodies that are joined to each other at multiple positions; and an arm fixing the sun visor body to the vehicle such that the sun visor body is turnable between an in-use position and a storage position. At least one joining structure of multiple joining structures including a pin portion projecting from an inner surface of the halved body of one half and an insertion hole of the halved body of the other half, the pin portion being insertable through the insertion hole. A front end of the pin portion has an umbrella-like portion formed by riveting so as to restrict a relative movement between the halved body of the one half and the halved body of the other half in a thickness direction.

According to the above aspect, it is possible to carry out the assembly of the sun visor body in a simple manner. In addition, the front end of the pin portion inserted into the insertion hole is subjected to the riveting from the halved body of the other half side. Through the riveting in this manner, it is possible to visually check a finishing state of each umbrella-like portion formed by the riveting. Hence, if the finishing state of (the riveting state of) the umbrella-like portions becomes an insufficient state (a state in which the umbrella-like portions are not caught on the edge of the insertion holes), it is possible to immediately notice this insufficient state, and correct this into a sufficient state. Accordingly, different from the related art, it is possible to prevent the sun visor with the umbrella-like portions finished in an insufficient state is prevented from being shipped as a product. As a result, as with the related art, for example, even when the sun visor body is turned between the in-use position and the storage position via the arm by picking up the lower edge of the sun visor body with fingers, both the halved bodies can be prevented from relatively moving in the thickness direction; therefore, no strange noises are caused, which is different from the related art.

In the above aspect, an inner surface of the halved body of the other half or of the one half may be provided with a projecting boss, and an inner surface of the halved body of the one half or of the other half may be provided with a guide portion fitted to the boss so as to restrict a relative movement between the halved body of the one half and the halved body of the other half in a surface direction.

According to the above configuration, it is possible to securely prevent strange noises from being caused when the sun visor body is turned.

In the above configuration, the pin portion may be provided inward of the boss or the guide portion.

According to the above configuration, it is unnecessary to dispose the pin portion at a position apart from the boss or the guide portion. Accordingly, it is possible to dispose the pin portion close to the position of the boss or the guide portion in a collective manner.

In the above configuration, the insertion hole formed in the halved body of the other half may be provided in a recessed portion recessed from an outer surface toward an inner surface of the halved body of the other half.

According to the above configuration, the umbrella-like portion formed by the riveting is prevented from being exposed to the outer surface of the halved body of the other half. Accordingly, it is possible to enhance appearance of the sun visor body after being joined.

In the above aspect, the sun visor body may be in a substantially rectangular shape, and at least one joining structure may be disposed on an upper edge in the substantially rectangular shape of the sun visor body in the in-use position. In addition, the joining structures may be disposed at multiple positions along the upper edge in the substantially rectangular shape of the sun visor body in the in-use position.

According to the above configuration, it is possible to limit application of the joining structures only to positions where it is desired to restrict a relative movement in the thickness direction of the halved bodies in pair. Hence, it is unnecessary to apply the joining structures to the entire edge of the sun visor body; therefore, only a simple joining structure is required for the rest.

In the above aspect, the sun visor body may include a support attachable to a hook provided in the vehicle, and the multiple joining structures may be arranged on a surface of the sun visor body such that a part of the surface of the sun visor body may be interposed between the joining structures, the part extending from the support in a direction perpendicular to an axial direction of the arm. In addition, in the above aspect, the sun visor body may include a clip attachment portion to which a clip is attached, the clip exerting an elastic force to secure a holding force for the sun visor body in the storage position, and the multiple joining structures may be arranged on a surface of the sun visor body such that a part of the surface of the sun visor body may be interposed between the joining structures, the part extending from clip attachment portion in a direction perpendicular to an axial direction of the arm.

According to the above configuration, it is possible to limit application of the joining structures only to positions where it is especially desired to restrict a relative movement in the thickness direction of the halved bodies in pair. Therefore, it is unnecessary to apply the joining structures to the entire edge of the sun visor body; thus, only a simple joining structure is required for the rest.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment for carrying out the present disclosure will be described with reference to FIG. 1 to FIG. 8. With reference to FIG. 1 to FIG. 6, an overall configuration of a sun visor 1 for a vehicle according to embodiment examples of the present disclosure will be described. In the following description, as an example of the "sun visor 1 for the vehicle", a "right sun visor 1 for an automobile (referred to simply as a "sun visor 1")" will be described. In the following description, upward, downward, frontward, rearward, leftward, and rightward respectively indicate up, down, front, rear, left, and right directions described in the above drawings, that is, respectively indicate up, down, front, rear, left, and right directions, as viewed from an occupant side when the sun visor 1 is turned to an in-use position thereof.

Figure 1:
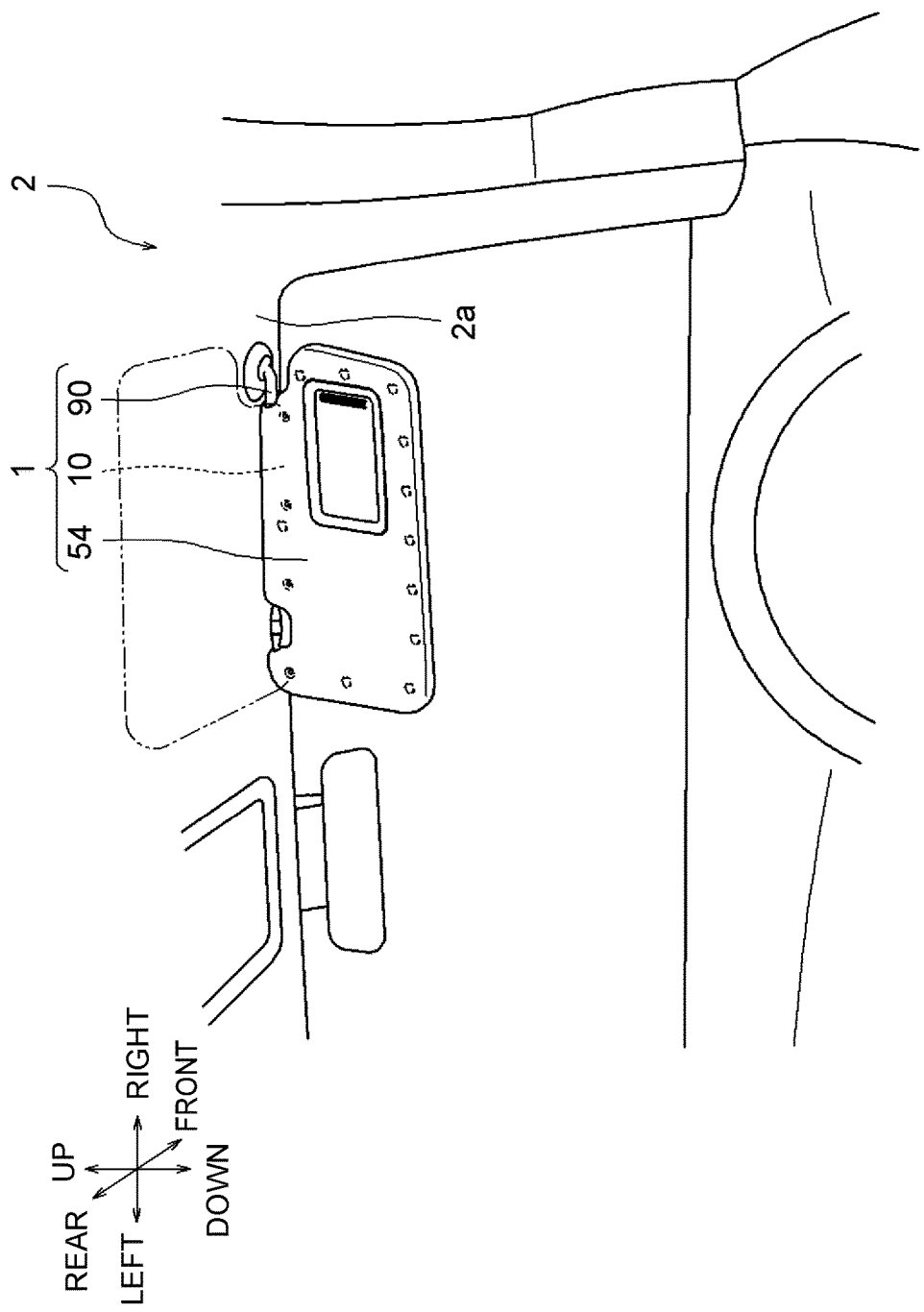
FIG. 1 is a perspective view showing a sun visor according to an embodiment, the sun visor being fixed to an automobile in a state in which a sun visor body is turned to an in-use position.

As shown in FIG. 1, the sun visor 1 includes: a sun visor body 10 in a substantially rectangular shape (a laterally long shape); a substantially L-shaped arm 90 used for fixing the sun visor body 10 to a vehicle body 2a of an automobile 2, and an outer skin 54 with which the sun visor body 10 is wrapped. Hereinafter, the sun visor body 10, the arm 90, and the outer skin 54 will separately be described.

First, with reference to FIG. 2 to FIG. 4 and FIG. 6-10, the description will be started with the sun visor body 10. The sun visor body 10 is composed by a pair of shell-shaped halved bodies 20, 30. The halved body 20 includes an inner surface 20a and an outer surface 20b. A cutout 22 is formed in an upper left part of the halved body 20 of one half. Right and left edges of the cutout 22 in the inner surface 20a of halved body 20 of the one half are formed with support attachment portions 24 that can pivotally support a support 80 such that the support 80 extends across these right and left edges. The support 80 is attachable to a hook (not illustrated) provided in a vehicle body 2a (vehicle side) of the automobile 2. Hence, as described later, when a lower edge of the sun visor body 10 is picked up with fingers so as to be turned between the in-use position and a storage position, it is possible to stabilize the turning action.

An upper right part of an inner surface 20a of the halved body 20 of the one half is provided with a clip attachment portion 26 to which a clip 92 exerting an elastic force for securing a holding force of the sun visor body 10 in the storage position can be attached. In addition, the inner surface 20a of the halved body 20 of the one half is formed with a rib group 20c arranged in a substantially two dimensional manner. With the configuration, it is possible to secure a strength necessary for the halved body 20 of the one half itself. The above-configured halved body 20 of the one half is integrally formed by a synthetic resin (such as PP, for example) having rigidity. The halved body 20 of the one half is configured in this manner.

Figure 3:
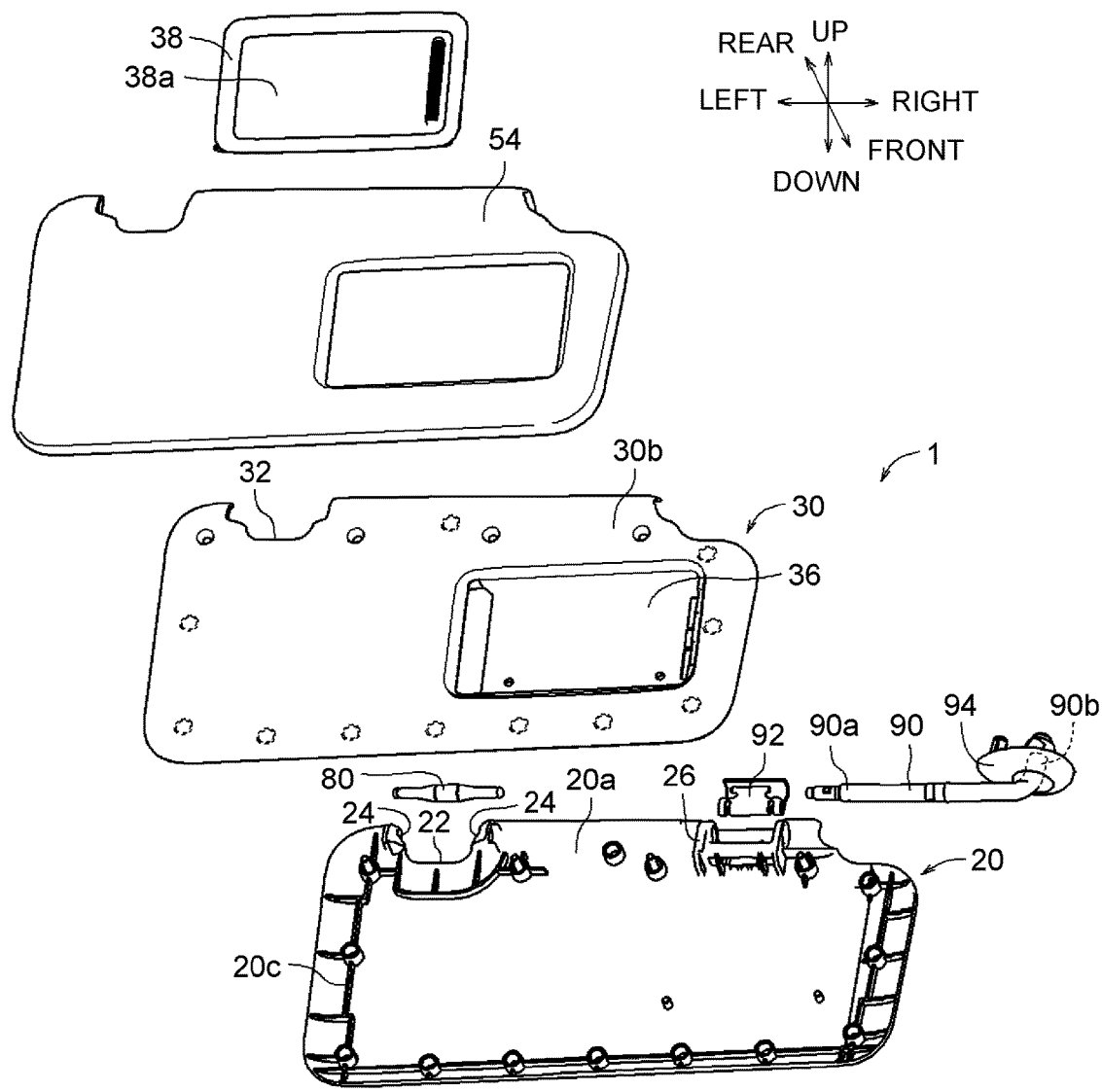
FIG. 3 is an exploded view of FIG. 2.

On the other hand, a cutout 32 is formed in an upper left part of the halved body 30 of the other half in such a manner that the cutout 32 corresponds to the cutout 22 of the halved body 20 of the one half. An upper right part of an inner surface 30a of the halved body 30 of the other half is provided with bearing portions 34 accepting the arm 90 inserted into the clip 92 attached to the clip attachment portion 26 of the halved body 20 of the one half. The left-right direction of FIG. 3 is an example of an "axial direction of the arm" in the claims. An outer surface 30b of the halved body 30 of the other half is formed with a recessed portion 36 in a substantially rectangular and laterally long shape. A mirror unit 38 whose mirror (not illustrated) is covered with a cover 38a slidable in the longitudinal direction is fixed to the recessed portion 36.

Since the mirror unit 38 is fixed in the recessed portion 36 in this manner, the thickness of the sun visor body 10 can be thin although the mirror unit 38 is fixed to the sun visor body 10. In addition, the inner surface 30a of the halved body 30 of the other half is formed with a rib group 30c arranged in a substantially two dimensional manner. With the configuration, it is possible to secure a strength necessary for the halved body 30 of the other half itself. The above-configured halved body 30 of the other half is integrally formed by a synthetic resin (such as PP, for example) having rigidity. The halved body 30 of the other half is configured in this manner.

The sun visor body 10 is assembled by joining the halved body 20 of the one half and the halved body 30 of the other half to each other at multiple positions. Here, the joining will be described in detail. The joining is configured by two types of structures (a first joining structure 40, a second joining structure 60). In the structures of two types, the first joining structure 40 is an example of a "joining structure" as set forth in the claims. Hereinafter, the first joining structure 40 and the second joining structure 60 of the two types will be separately described.

Figure 5:
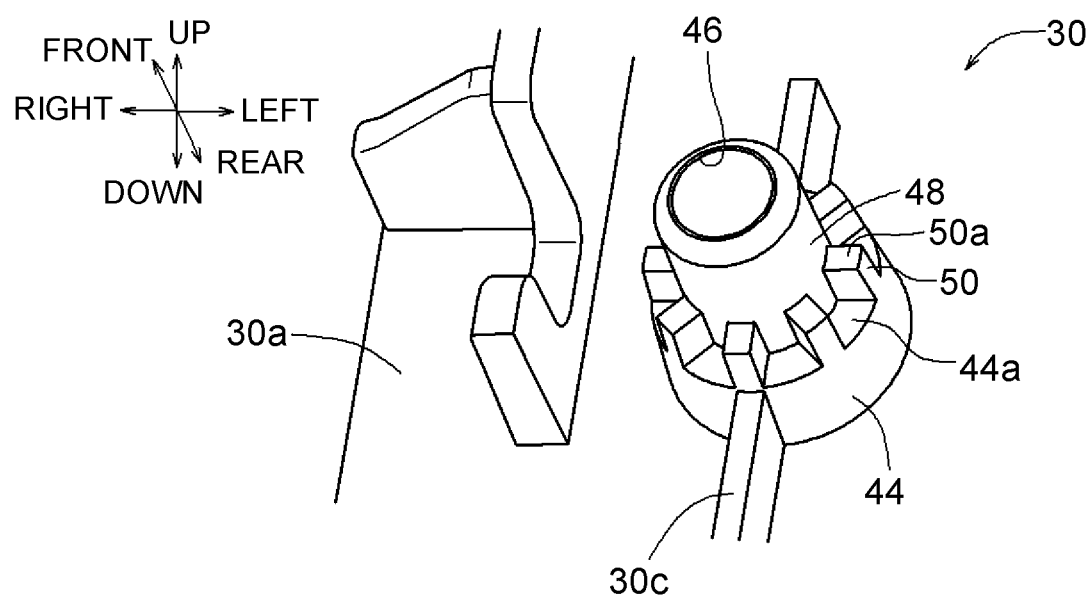
FIG. 5 is an enlarged view of a major part of the halved body of the other half in FIG. 4.
Figure 6:
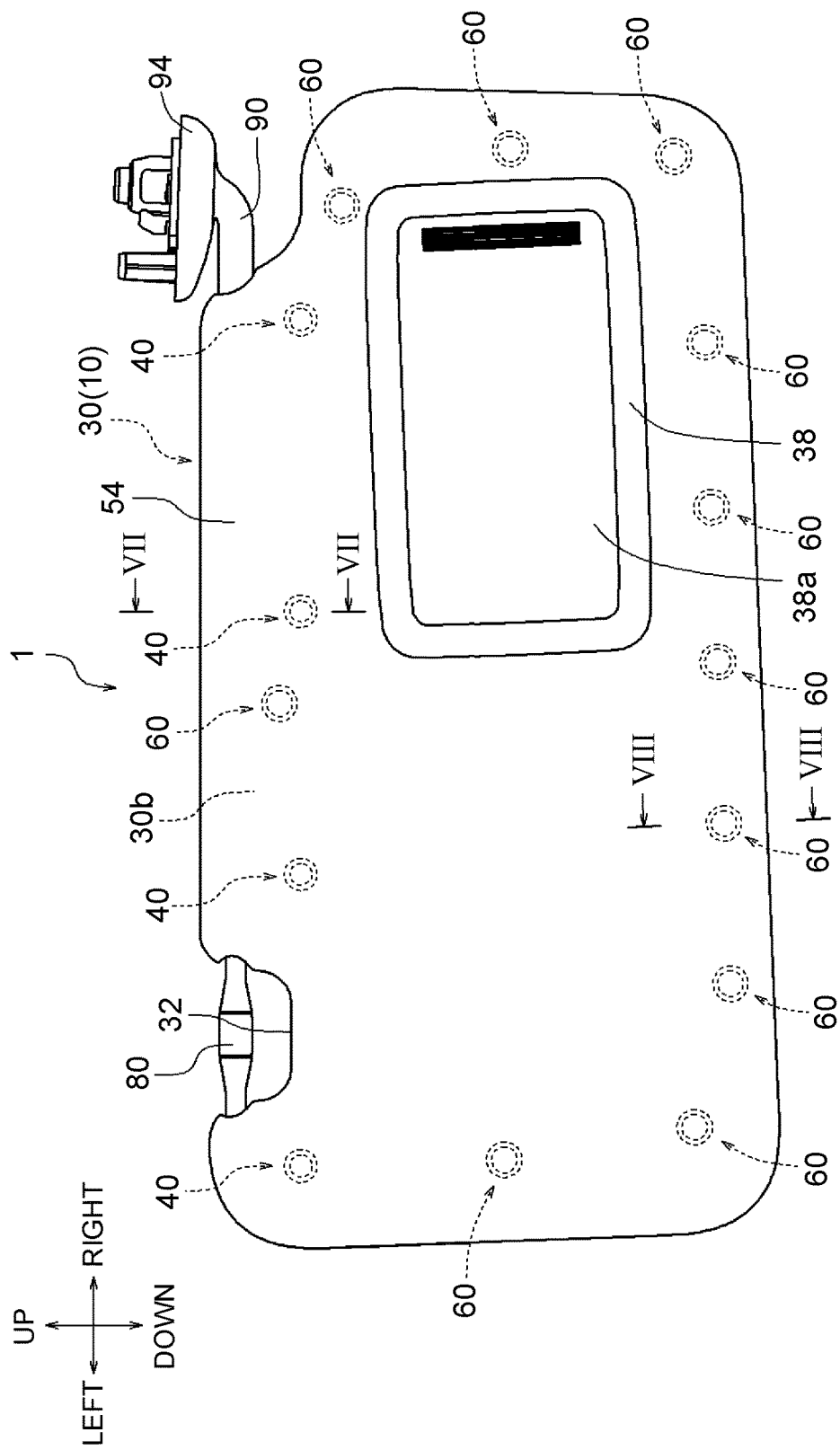
FIG. 6 is a front view of FIG. 2.
Figure 7:
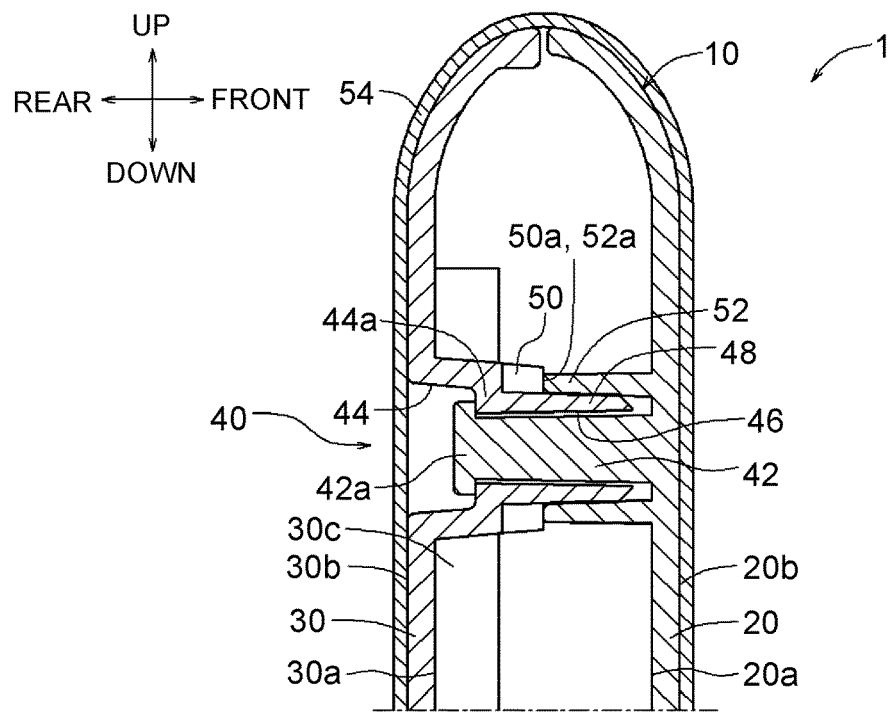
FIG. 7 is a sectional view taken along line VII-VII of FIG. 6.
Figure 8:
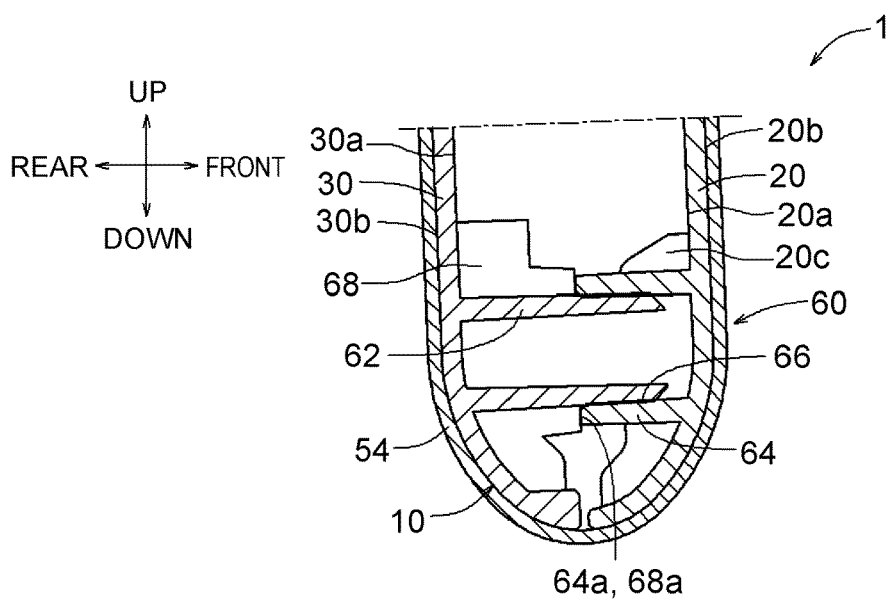
FIG. 8 is a sectional view taken along line VIII-VIII of FIG. 6.

With reference to FIG. 5, FIG. 7, and FIG. 8, description will be started with the first joining structure 40. First, respective components composing the first joining structure 40 will be described (see FIG. 5 and FIG. 7). The inner surface 20a of the halved body 20 of the one half is formed with pin portions 42 projecting inward. The outer surface 30b of the halved body 30 of the other half is formed with circular recessed portions 44a via steps 44. In each recessed portion 44a, there is formed a cylindrical boss 48 projecting inward, the boss 48 including an insertion hole 46 whose inner diameter is slightly greater than an outer diameter of the pin portion 42.

In addition, each recessed portion 44a is formed with eight ribs 50 projecting inward with equal intervals in the circumferential direction. The inner surface 20a of the halved body 20 of the one half is formed with cylindrical guide portions 52 projecting inward, each guide portion 52 to which an outer surface of each boss 48 can be fitted. The above description is an example of description: "the pin portion is provided inward of the boss or the guide portion" as set forth in the claims.

As described later, in a state in which the halved bodies 20, 30 in pair are pre-assembled, a height of each rib 50 and a height of each guide portion 52 are set such that a stopper 50a that is a front end of the rib 50 and a front end 52a of the guide portion 52 interfere with each other. With this, when the halved bodies 20, 30 in pair are pre-assembled, the pin portions 42 of the halved body 20 of the one half are prevented from being excessively inserted into the insertion holes 46 of the halved body 30 of the other half. Accordingly, in the halved bodies 20, 30 in pair after being joined to each other, the recessed portions 44a of the halved body 30 of the other half can be prevented from being excessively lowered.

Next, a procedure of the joining work of the first joining structure 40 will be described. First, the halved bodies 20, 30 in pair are pre-assembled. By carrying out the pre-assembling work, the pin portions 42 of the halved body 20 of the one half are inserted into the corresponding insertion holes 46 of the halved body 30 of the other half. In addition, by carrying out the pre-assembling work, the bosses 48 of the halved body 30 of the other half are fitted to the insides of the corresponding guide portions 52 of the halved body 20 of the one half.

Next, a riveting work is carried out so as to apply riveting (e.g. ultrasonic riveting, thermal riveting, etc.) to the front end of each above-inserted pin portion 42 from the halved body 30 of the other half side toward each recessed portion 44a side. Then, an umbrella-like portion 42a whose diameter is greater than an inner diameter of the insertion hole 46 is formed on a front end of each corresponding pin portion 42 (see FIG. 7). Through the riveting work, the front end 52a of the guide portion 52 provided on the inner side of the halved body 20 of the one half, and the stopper 50a that is a front end of each rib 50 provided inward of each recessed portion 44a provided on the inner side of the halved body 30 of the other half are set to interfere with each other. At the same time, the umbrella-like portion 42a is inserted through the insertion hole 46 to be caught on an edge of each recessed portion 44a. Hence, in cooperation with a part formed by continuously joining the guide portion 52, the rib 50, and the recessed portion 44a in the thickness direction as well as the umbrella-like portion 42a, a relative movement between the halved body 20 of the one half and the halved body 30 of the other half in the thickness direction is restricted. Accordingly, it is possible to prevent the inserted pin portion 42 from coming out from the insertion hole 46.

Therefore, it is possible to restrict a relative movement between the pre-assembled halved bodies 20, 30 in pair in the thickness direction. Accordingly, the pre-assembled halved bodies 20, 30 in pair can be joined to each other. In addition, the pre-assembled halved bodies 20, 30 in pair can also be joined by the above-described fitting between the guide portions 52 and the bosses 48. In this case, the joining is carried out by the fitting, and thus it is possible to restrict a relative movement of the both halved bodies 20, 30 in a surface direction.

The first joining structure 40 is configured in this manner. The above-configured first joining structure 40 is set at four positions with appropriate intervals in such a manner as to be located along an upper edge of the sun visor body 10 in the in-use position (see FIG. 6). The first joining structures 40 are set at multiple positions in this manner, and thus it is possible to enhance a joint strength of the halved bodies 20, 30 in pair after being joined.

Next, the second joining structure 60 will be described. First, respective components composing each second joining structure 60 will be described (see FIG. 8). The inner surface 20a of the halved body 20 of the one half is formed with cylindrical bosses 64, each projecting inward and including an insertion hole 66 whose inner diameter is substantially the same as an outer diameter of a pin portion 62 described later. The inner surface 30a of the halved body 30 of the other half is formed with cylindrical pin portions 62, each of which projects inward and can be fitted to an inner surface of an insertion hole 66 of each corresponding boss 64. In addition, the inner surface 30a of the halved body 30 of the other half is formed with eight ribs 68 projecting inward with equal intervals in the circumferential direction outward of the pin portion 62.

As described later, in the state in which the halved bodies 20, 30 in pair are pre-assembled, a height of each boss 64 and a height of each rib 68 are set such that a front end 64a of the boss 64 and a stopper 68a that is a front end of the rib 68 interfere with each other. Through this, when the halved bodies 20, 30 in pair are pre-assembled, it is possible to prevent the insertion hole 66 of each boss 64 of the halved body 20 of the one half from being excessively inserted into each corresponding pin portion 62 of the halved body 30 of the other half.

Next, a procedure of the joining work of the second joining structures 60 will be described. The joining work of the second joining structures 60 is carried out at the same time of the above joining work of the first joining structures 40. Specifically, in each of the above-described first joining structures 40, when the pre-assembly work of the halved bodies 20, 30 in pair is carried out, each pin portion 62 of the halved body 30 of the other half is fitted into the inside of the insertion hole 66 of each corresponding boss 64 of the halved body 20 of the one half. The fitting allows the halved bodies 20, 30 in pair after being pre-assembled to be joined to each other. In this case, because the joining is carried out by the fitting, it is also possible to restrict a relative movement between both the halved bodies 20, 30 in the surface direction.

Each second joining structure 60 is configured in the above manner. The above-configured second joining structures 60 are set at multiple positions (e.g. 11 positions) with appropriate intervals in such a manner as to be located along the edge of the sun visor body 10 in a substantially rectangular shape (see FIG. 6). The second joining structures 60 are set at multiple positions in this manner, and thus it is possible to enhance a joint strength of the halved bodies 20, 30 in pair after being joined, and it is also possible to carry out the assembly in a simple manner.

Next, with reference again to FIG. 2 to FIG. 4, the arm 90 will be described. As already described, the arm 90 is formed in a substantially L-shape, and one end 90a of the arm 90 composing the longitudinal end portion is rotatably inserted into the clip 92, and a fixing bracket 94 attachable to the vehicle body 2a of the automobile 2 is fixed to the other end 90b of the arm 90 composing the lateral end portion.

With the arm 90, the sun visor body 10 can be turned by picking up the edge of the sun visor body 10 with fingers between the in-use position (a position indicated by a solid line in FIG. 1) and the storage position (a position indicated by an imaginary line in FIG. 1). Hence, the sun visor body 10 can be stored in a simple manner when the sun visor body 10 is out of use. With the arm 90, the sun visor body 10 can be used from the in-use position to another in-use position (a position substantially parallel to glass of a front door) by turning the sun visor body 10 around an axis of the other end 90b by 90°.

Figure 2:
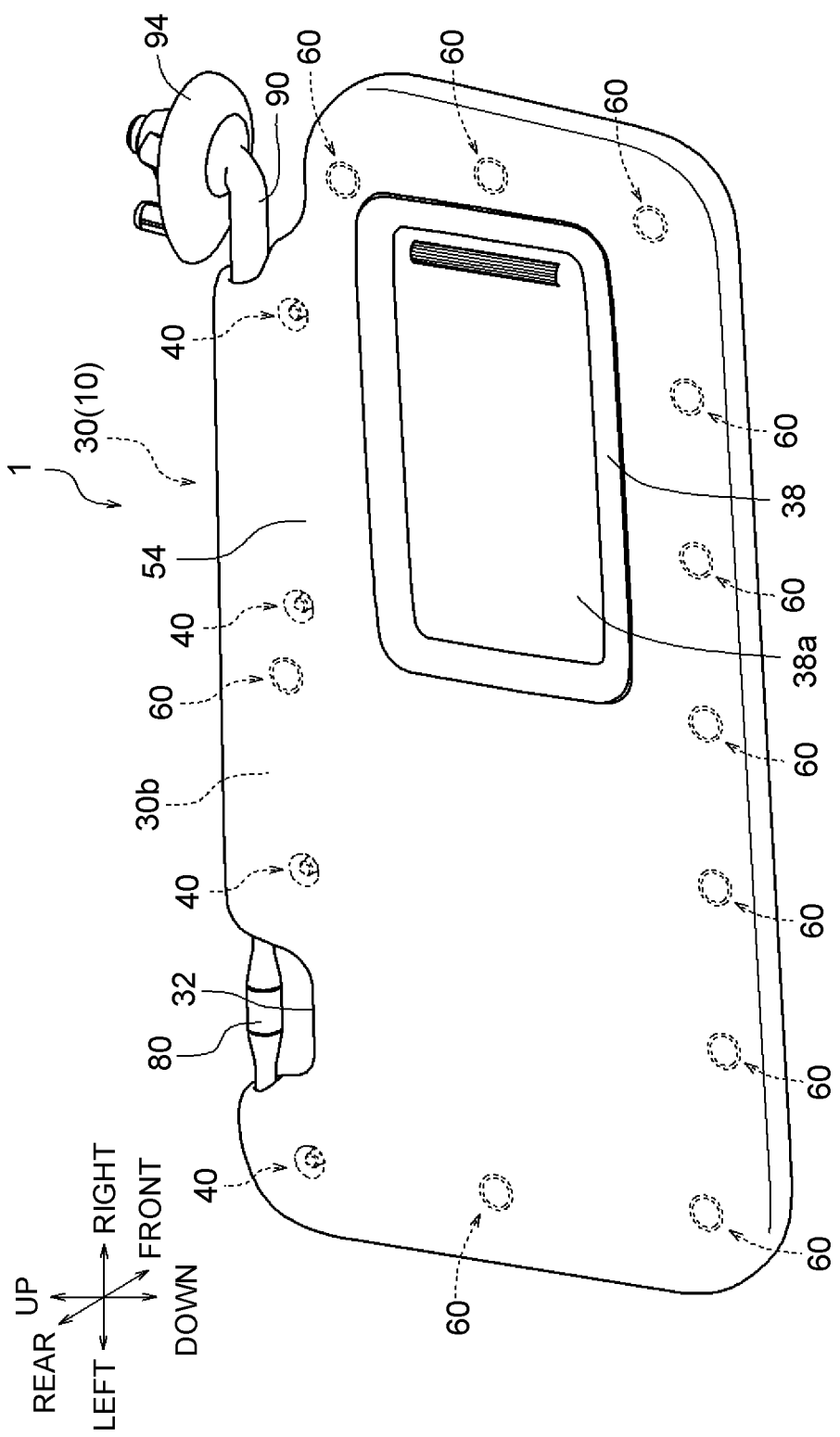
FIG. 2 is an enlarged view of a sun visor of FIG. 1.
Figure 4:
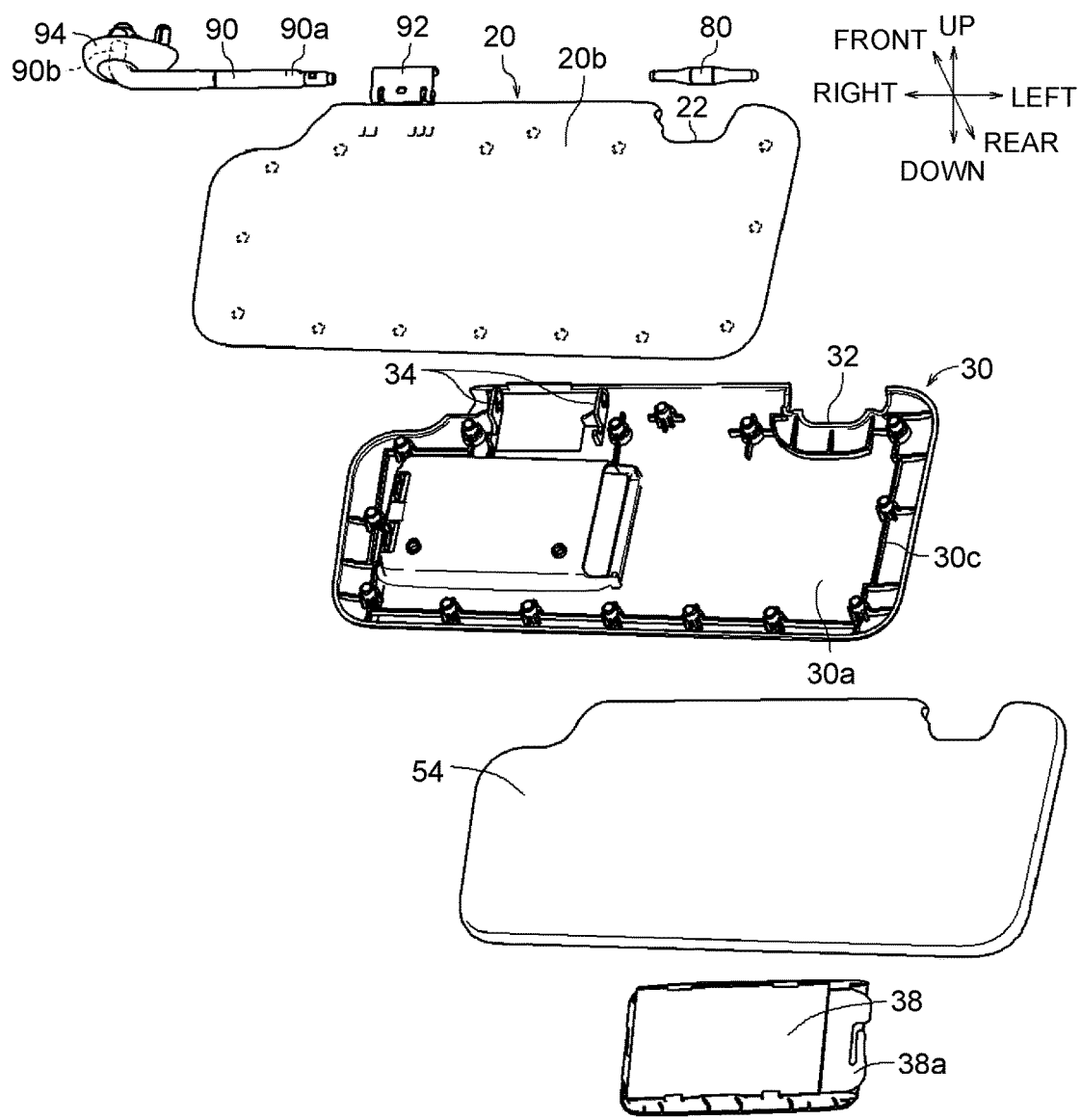
FIG. 4 is a perspective view of FIG. 3 as viewed from a back surface side.

Finally, with reference to FIG. 2 to FIG. 4, the outer skin 54 will be described. The outer skin 54 is formed in a bag shape so as to wrap the sun visor body 10 therewith, as already described. The outer skin 54 is composed by PVC (vinyl chloride), fabric (a composite of fabric and urethane), and others. In the outer skin 54, an opening 54a is formed at a position corresponding to the mirror unit 38. Through this, it is configured to suppress wrinkles from being caused when the mirror unit 38 is assembled into the recessed portions 36 although it is wrapped with the outer skin 54.

The sun visor 1 is composed by the sun visor body 10, the arm 90, and the outer skin 54, as described above. Here, a procedure of assembling the sun visor 1 will be described. First, a work of assembling the clip 92 to the clip attachment portion 26 of the halved body 20 of the one half, and applying grease to the clip 92 after being assembled is carried out. Next, a work of meeting and press-fitting the halved body 20 of the one half and the halved body 30 of the other half to be combined to each other is carried out. Then, a work of performing riveting on both the halved body 20 of the one half and the halved body 30 of the other half after being combined is carried out. Through this, the halved body 20 and the halved body 30 are joined to be assembled into the sun visor body 10.

Subsequently, a work of covering the sun visor body 10 with the outer skin 54 is carried out. With the covering, the umbrella-like portions 42a subjected to the riveting and the steps 44 can be covered. Accordingly, it is possible to enhance the appearance of the sun visor body 10. Next, a work of inserting the one end 90a of the arm 90 into the clip 92 of the sun visor body 10 is carried out. Subsequently, a work of assembling the support 80 to the support attachment portion 24 of the sun visor body 10 is carried out. Finally, a work of attaching the mirror unit 38 into the recessed portion 36 of the sun visor body 10 is carried out. Through the above work, the sun visor 1 is assembled.

The sun visor 1 according to the embodiment example of the present disclosure is configured in the above manner. According to the configuration, it is possible to carry out the assembly of the sun visor body 10 in a simple manner. In addition, according to the configuration, the front end of the pin portion 42 inserted into the insertion hole 46 is subjected to the riveting from the halved body 30 of the other half side. Through the riveting in this manner, it is possible to visually check a finishing state of the umbrella-like portion 42a formed by the riveting. Hence, even if the finishing state of (the riveting state of) the umbrella-like portion 42a becomes an insufficient state (a state in which the umbrella-like portion 42a is not caught on the edge of the insertion hole 46), it is possible to immediately notice the insufficient state, and correct this into a sufficient state. Accordingly, different from the related art, it is possible to prevent the sun visor 1 with the umbrella-like portions 42a in an insufficient finishing state is prevented from being shipped as a product. As a result, even when the sun visor body 10 is turned between the in-use position and the storage position via the arm 90 by picking up the lower edge of the sun visor body 10 with fingers, both the halved bodies 20, 30 can be prevented from relatively moving in the thickness direction; therefore, no strange noises are caused.

According to the configuration, a relative movement between both the halved bodies 20, 30 in the surface direction is also restricted. Hence, it is possible to securely prevent strange noises from being caused when the sun visor body 10 is turned.

In addition, according to the configuration, the pin portion 42 is formed inward of the boss 48 or the guide portion 52. Hence, it is unnecessary to dispose the pin portion 42 at a position apart from the boss 48 or the guide portion 52. Accordingly, it is possible to dispose the pin portion 42 close to the position of the boss 48 or the guide portion 52 in a collective manner.

According to the configuration, the insertion hole 46 is formed in the recessed portion 44a. Hence, the umbrella-like portion 42a formed by the riveting is prevented from being exposed to the outer surface 30b of the halved body 30 of the other half. Accordingly, it is possible to enhance appearance of the sun visor body 10 after being joined.

In addition, according to the configuration, the first joining structures 40 are set at four positions with appropriate intervals so as to be located along the upper edge of the sun visor body 10 in the in-use position. Hence, it is possible to apply the first joining structures 40 to only positions where it is desired to restrict a relative movement between the halved bodies 20, 30 in pair in the thickness direction. Hence, it is unnecessary to apply the first joining structures 40 to the entire edge of the sun visor body 10; therefore, it is possible to reduce man-hours required for the working, to thereby require only a simple joining structure (the second joining structure 60 in the embodiment) for the rest. In this manner, if the first joining structures 40 are set at multiple positions along the upper edge of the sun visor body 10, when the sun visor body 10 is turned between the in-use position and the storage position by picking up the lower edge of the sun visor body 10 with fingers, it is possible to prevent fingers of an occupant from touching the umbrella-like portions 42a and the steps 44 subjected to the riveting. Accordingly, it is possible to prevent an occupant from sensing foreign matters.

The aforementioned description relates to only one embodiment of the present invention, and it is not intended that the present invention is limited to the above description.

In the embodiment example, it has been described that the joining between the halved bodies 20, 30 in pair are carried out by the first joining structures 40 and the second joining structures 60. However, the present invention is not limited to this, and the joining between the halved bodies 20, 30 in pair may be carried out by only the first joining structures 40. In this case, the first joining structures 40 are to be applied also to the part to which the second joining structures 60 are applied.

In the embodiment example, it has been described that the first joining structures 40 are set at four positions with appropriate intervals so as to be located along the upper edge of the sun visor body 10 in a substantially rectangular shape. However, the positions are not limited to the four positions, and any number of (one, two, three, five, etc.) positions may be employed. In addition, the positions may be set at any positions. This is the same in the second joining structures 60.

Figure 9:
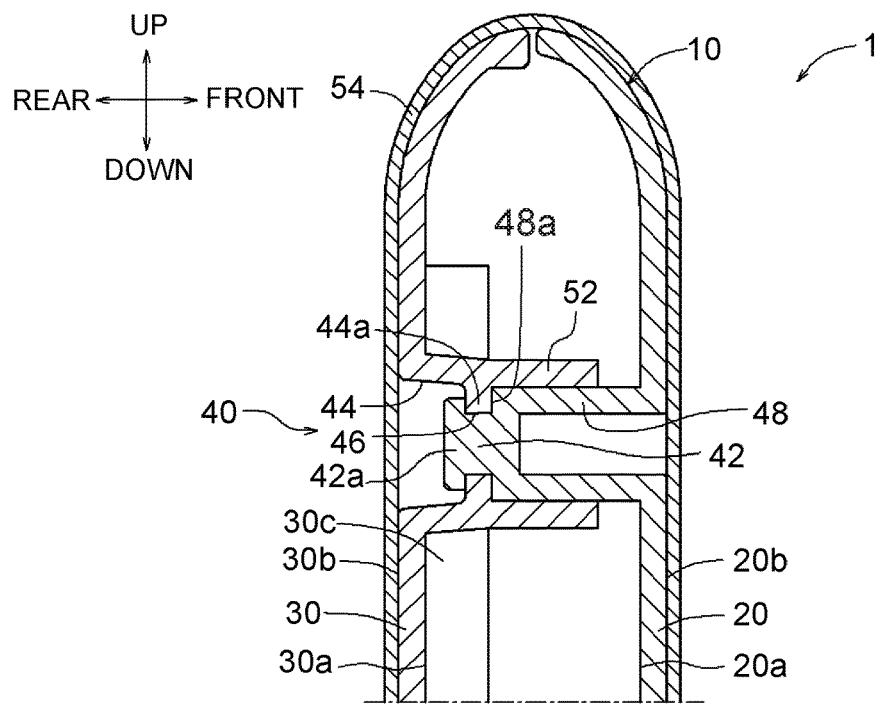
FIG. 9 is a variation of FIG. 7 (Variation 1)

In the embodiment example, it has been described that in each first joining structure 40, the boss 48 projects inward from the halved body 30 of the other half, and the guide portion 52 projects inward from the halved body 20 of the one half. However, the present invention is not limited to this; and inversely to this, as shown in FIG. 9, the boss 48 may project inward from the halved body 20 of the one half, and the guide portion 52 may project inward from the halved body 30 of the other half (Variation 1).

Also in this case, as with the embodiment example, when the riveting work is carried out, the front end 48a of each boss 48 provided on the inner side of the halved body 20 of the one half, and the stopper 50a of each recessed portion 44a provided on the inner side of the halved body 30 of the other half are set to interfere with each other, and each umbrella-like portion 42a is inserted through each insertion hole 46 to be caught on the edge of each recessed portion 44a. Hence, in cooperation with the part formed by continuously joining each boss 48 and each recessed portion 44a in the thickness direction as well as each umbrella-like portion 42a, a relative movement between the halved body 20 of the one half and the halved body 30 of the other half in the thickness direction is restricted. Accordingly, it is possible to prevent each inserted pin portion 42 from coming out from each corresponding insertion hole 46.

Figure 10:
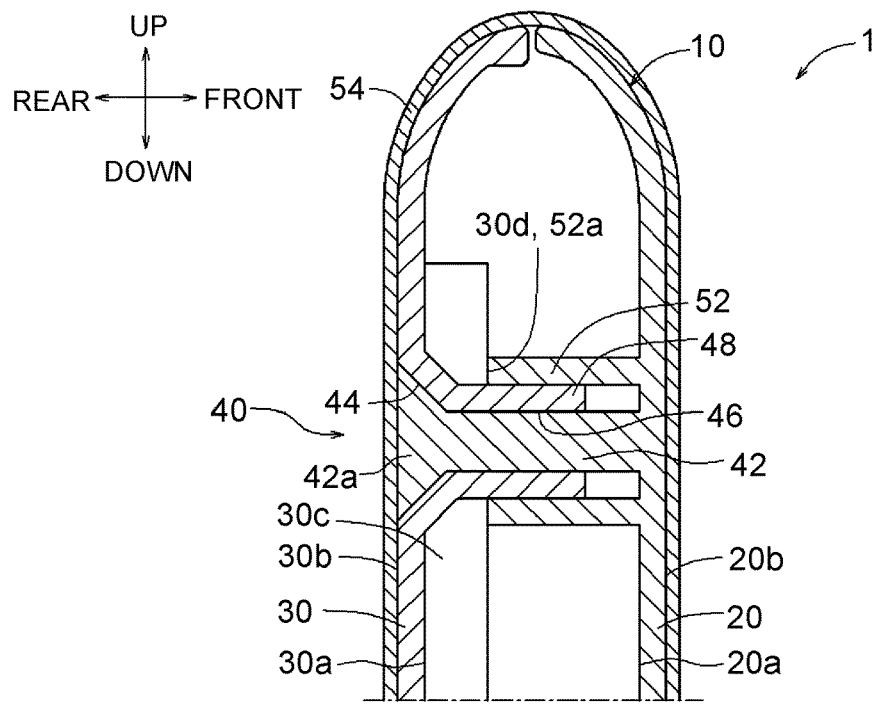
FIG. 10 is another variation of FIG. 7 (Variation 2)
Figure 11:
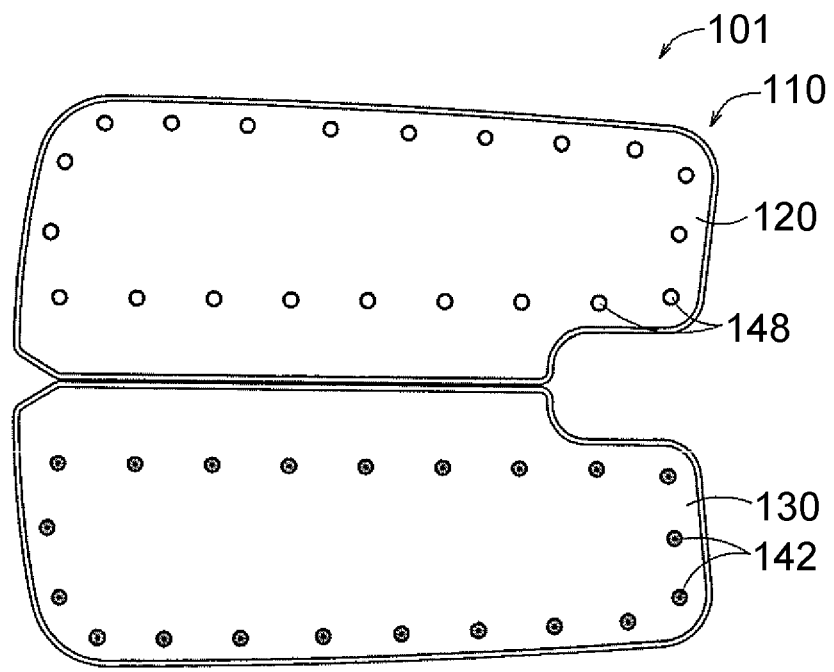
FIG. 11 is a plan view showing a sun visor body of a sun visor of related art in an exploded state.
Figure 12:
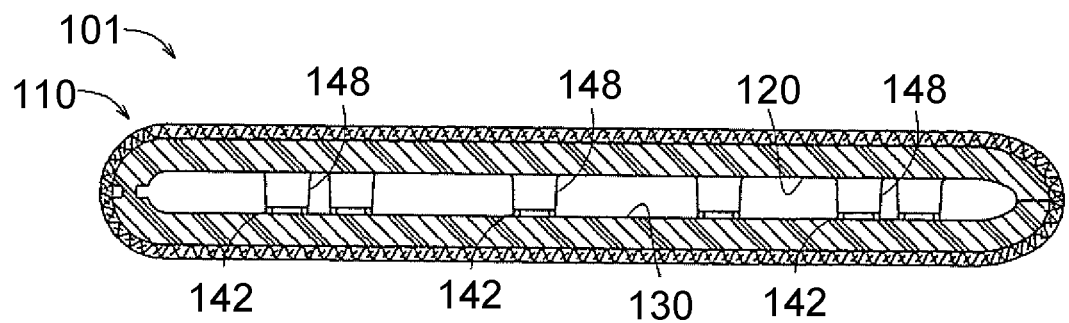
FIG. 12 is a longitudinal sectional view of a pair of halved bodies in FIG. 11 after being joined.
Figure 13:
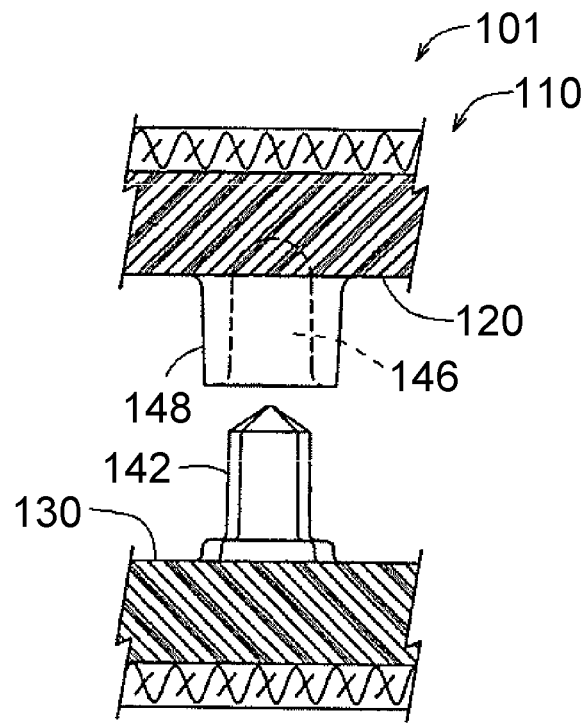
FIG. 13 is a view showing a state of FIG. 12 before the joining.

In the embodiment example, it has been described that the umbrella-like portion 42a is configured to be of a flat type. However, the present invention is not limited to this, and as shown in FIG. 10, the umbrella-like portion 42a formed by the riveting may be of a flash type (Variation 2). Of course, the umbrella-like portion 42a formed by the riveting may be of a knurled type or a dome type.

Also in this case, as with the embodiment example, when the riveting work is carried out, the front end 52a of each guide portion 52 provided on the inner side of the halved body 20 of the one half, and each stopper 30d of the rib group 30c provided on the inner side of the halved body 30 of the other half are set to interfere with each other, and each umbrella-like portion 42a is inserted through each insertion hole 46 to be caught on the edge of each step 44. Hence, in cooperation with the part formed by continuously joining each guide portion 52 and the rib group 30c in the thickness direction and the umbrella-like portion 42a, a relative movement between the halved body 20 of the one half and the halved body 30 of the other half in the thickness direction is restricted. Accordingly, it is possible to prevent each inserted pin portion 42 from coming out from each corresponding insertion hole 46.

In addition, in the embodiment example, it has been described that the eight ribs 50 are formed with equal intervals in the circumferential direction of each recessed portion 44a. However, the present invention is not limited to this, and the ribs 50 may be formed with appropriate intervals in the circumferential direction of each recessed portion 44a. Of course, any number of the ribs 50 may be employed.

In addition, in the embodiment example, it has been described that the eight ribs 68 are formed with equal intervals in the circumferential direction outward of each pin portion 62. However, the present invention is not limited to this, and the ribs 68 may be formed with appropriate intervals in the circumferential direction outward of each pin portion 62. Of course, any number of the ribs 68 may be employed.

What is claimed is:

1. A sun visor for a vehicle, the sun visor comprising:
a sun visor body including a pair of shell-shaped halved bodies that are joined to each other at multiple positions;
an arm fixing the sun visor body to the vehicle such that the sun visor body is rotatable between an in-use position and a storage position; and
at least one joining structure of a plurality of joining structures including a pin portion projecting from an inner surface of a first halved body of the pair of halved bodies and an insertion hole of a second halved body of the pair of halved bodies, the pin portion being insertable into the insertion hole, wherein:
a front end of the pin portion has an umbrella-shaped portion formed by riveting that restricts a relative movement between the first halved body and the second halved body of the pair of halved bodies in a thickness direction of the sun visor,
a projecting boss projects from one of the inner surface of the first halved body or an inner surface of the second halved body, and
a guide portion is formed on the other one of the inner surface of the first halved body or the inner surface of the second halved body, the guide portion being fitted to the projecting boss so as to restrict a relative movement between the first halved body and the second halved body in a surface direction of the sun visor.

2. The sun visor according to claim 1, wherein the pin portion is provided inward of the projecting boss or the guide portion.

3. The sun visor according to claim 2, wherein the insertion hole formed in the second halved body is provided in a recessed portion recessed from an outer surface toward the inner surface of the second halved body.

4. The sun visor according to claim 1, wherein:

the sun visor body is formed in a substantially rectangular shape; and the at least one joining structure of the plurality of joining structures is disposed on an upper edge of the sun visor body in the in-use position.

5. The sun visor according to claim 4, wherein the plurality of joining structures are disposed at multiple positions along the upper edge of the sun visor body in the in-use position.

6. The sun visor according to claim 1, wherein:

the sun visor body includes a support attachable to a hook provided in the vehicle; and the plurality of joining structures are arranged on a surface of the sun visor body such that a part of the surface of the sun visor body is interposed between the plurality of joining structures, the part of the surface of the sun visor body extending from the support in a direction perpendicular to an axial direction of the arm.

7. The sun visor according to claim 1, wherein:

the sun visor body includes a clip attachment portion to which a clip is attached, the clip exerting an elastic force to secure a holding force for the sun visor body in the storage position; and the plurality of joining structures are arranged on a surface of the sun visor body such that a part of the surface of the sun visor body is interposed between the plurality of joining structures, the part of the surface of the sun visor body extending from clip attachment portion in a direction perpendicular to an axial direction of the arm.

* * * * *